(12) United States Patent
Gehr et al.

(10) Patent No.: US 8,073,674 B2
(45) Date of Patent: Dec. 6, 2011

(54) SCSI DEVICE EMULATION IN USER SPACE FACILITATING STORAGE VIRTUALIZATION

(75) Inventors: Charles R. Gehr, Louisville, CO (US); Ceri I. Davies, Boulder, CO (US); Stacy Maydew, Frederick, CO (US)

(73) Assignee: Oracle America, Inc., Redwood City, CA (US)

( * ) Notice: Subject to any disclaimer, the term of this patent is extended or adjusted under 35 U.S.C. 154(b) by 635 days.

(21) Appl. No.: 12/236,095

(22) Filed: Sep. 23, 2008

(65) Prior Publication Data

US 2010/0076744 A1    Mar. 25, 2010

(51) Int. Cl.
*G06F 9/455* (2006.01)
(52) U.S. Cl. .............. 703/24; 703/22; 703/27; 711/203; 710/33
(58) Field of Classification Search .............. 703/22–28; 707/690; 711/114, 170, 203; 710/11, 33
See application file for complete search history.

(56) References Cited

U.S. PATENT DOCUMENTS

| | | | | |
|---|---|---|---|---|
| 5,729,710 | A * | 3/1998 | Magee et al. ................. | 711/203 |
| 5,842,226 | A * | 11/1998 | Barton et al. ................. | 711/203 |
| 6,108,684 | A * | 8/2000 | DeKoning et al. ............. | 718/105 |
| 6,925,531 | B2 * | 8/2005 | Konshak et al. ............. | 711/114 |
| 7,107,385 | B2 * | 9/2006 | Rajan et al. ........................ | 711/4 |
| 7,130,786 | B2 * | 10/2006 | Grebenev ......................... | 703/22 |
| 7,158,973 | B2 * | 1/2007 | Mandal et al. ........................ | 1/1 |
| 7,464,019 | B1 * | 12/2008 | Serrano et al. .................. | 703/25 |
| 7,475,277 | B1 * | 1/2009 | Holdman et al. ............. | 714/5.11 |
| 7,689,803 | B2 * | 3/2010 | Karr et al. ...................... | 711/203 |
| 7,873,700 | B2 * | 1/2011 | Pawlowski et al. ........... | 709/213 |
| 2006/0136666 | A1 * | 6/2006 | Pang et al. ..................... | 711/114 |
| 2007/0198244 | A1 * | 8/2007 | King et al. ...................... | 703/27 |
| 2008/0183908 | A1 * | 7/2008 | Slater et al. ...................... | 710/11 |

OTHER PUBLICATIONS

Milligan et al, C. Online Storage Virtualization: The Key to Managing the Data Explosion, IEEE, Proceedings of the 35th Annual Hawaii international Conference on System Sciences, 2002, pp. 3052-3060.*

Simitci et al, H. Evaluation of SCSI Over TCP/IP and SCSI Over Fibre Channel Connections, IEEE, Hot Interconnects, 2001, pp. 87-91.*

(Continued)

*Primary Examiner* — Russell Frejd
(74) *Attorney, Agent, or Firm* — Marsh Fischmann & Breyfogle LLP; Kent A. Lembke; Jon P. Deppe

(57) ABSTRACT

A method for storage virtualization in user space. The method includes providing a first emulation module running in the OS kernel and providing a second emulation module in the user space of the computer, which may emulate a media changer or other SCSI or other storage device. The method continues with a kernel-resident driver receiving a packet of data at a port of the computer that is linked to a data communications network (such as a SAN). The packet of data may include command data for a particular data storage device (e.g., a SCSI command for a SCSI device). The method includes operating the first emulation module to communicate with the driver and to then pass through the packet of data to the second emulation module, allowing the second emulation module to run in user space but efficiently receive data from the kernel-resident driver via the first emulation module.

19 Claims, 5 Drawing Sheets

OTHER PUBLICATIONS

Zhou et al, K. Pipelining Scheduling and Hierarchical-Volume Management in a Storage Area Network, Proceedings of the 2006 IEEE/SMC International Conference on System of Systems Engineering, Apr. 2006, pp. 265-270.*

Srikrishnan et al, J. Sharing FCP Adapters Through Virtualization, IEEE, IBM Journal of Research and Development, 2007, pp. 103-118.*

Clarke, B. Solemn: Solaris Emulation Mode for Sparc Sulima, IEEE, 37th Annual Simulation Symposium, 2004, pp. 64-71.*

* cited by examiner

SCSI DEVICE EMULATION IN USER SPACE FACILITATING STORAGE VIRTUALIZATION

BACKGROUND OF THE INVENTION

1. Field of the Invention

The present invention relates, in general, to methods and systems for storage virtualization including emulating SCSI devices, and, more particularly, to systems and methods for providing high performance SCSI device emulation with virtualization code or modules that run at least partially in the user space of a computer device or system rather than wholly within the kernel.

2. Relevant Background

Recently there has been a strong demand for storage virtualization, and studies show that the trend toward virtualizing or emulating storage devices will only increase in coming years. Virtualization of data storage devices or "storage virtualization" generally refers to the process of abstracting logical storage from physical storage. Often storage virtualization involves pooling or aggregating a variety of heterogeneous devices such as tape drives, tape libraries, and disk arrays but presenting a portion to a client device for its use based on its needs or demands (e.g., presenting a tape drive to a client device requesting data storage but physically utilizing disk storage device or portions of two or more tape drives). Virtualization of storage helps achieve location independence by abstracting the physical location of the stored data. The virtualization system presents to the user or client a logical space for data storage, and the virtualization system handles the process of mapping the logical space to the actual physical location.

Storage virtualization is often achieved in part through emulation or virtualization of storage devices to clients linked to a communications network such as a storage area network (SAN). Small Computer System Interface (SCSI) is a bus that allows computers or client devices to communicate with peripheral devices such as storage devices using a well-defined communication protocol, and tape drives, disk drives, tape libraries may be considered SCSI devices. SCSI device emulation is utilized in many products that provide storage virtialization. For example, a storage server may be adapted for storage virtualization by functioning to present on a SAN what appear to host applications or other storage clients to be SCSI devices such as tape or disk drives while, in fact, the presented device is virtual or emulated. Such storage device emulation allows product vendors to insert value adding solutions or logic behind the virtual SCSI devices. One example may be a virtual tape in which a host application believes it is writing to a tape drive where, instead, the storage server product is actually using a disk drive to store the host's data. There are many types of virtualization products with virtualization making up a large segment of the overall storage market.

One common feature of most virtualization products is the emulation of SCSI devices, which presents a number of challenges and complexities. Device emulation is typically achieved with a software program or module that runs inside the operating system (OS) space or kernel. The emulation module runs in the kernel such that it can talk or communicate with a host bus adapter (HBA) or other interface to the SAN or with a driver in the kernel that drives HBA input/output (I/O). As a result, SCSI emulation requires a significant amount of difficult and/or tedious coding as the kernel-based emulation module is written in a low level language (such as the C Programming Language) to support running inside the kernel. As such, the downsides and difficulties associated with developing kernel-resident code apply.

There remains a need for methods and systems for achieving high performance SCSI device emulation to facilitate data storage virtualization. Preferably, such methods and systems would provide improved interfacing between emulation products or modules and with business logic or storage products/modules running or present in the user space of storage server products.

SUMMARY OF THE INVENTION

The inventors recognized that a better approach to emulation code development may be to place the emulation code/module in user space where a higher level language, such as Java, may be used to interface naturally with the business logic that provide value added functions. However, in order to perform SCSI device efficiently, the user space application code needs to communicate with kernel-resident transport drivers. With this in mind, the present invention addresses the above problems by providing a SCSI device emulation method that includes a highly efficient and transport-independent technique for communicating between a kernel transport layer driver and a user space emulation application (e.g., a media changer or the like provided in Java or other user space programming language) in order to provide SCSI device emulation. By utilizing the SCSI device emulation method with its kernel-to-user space communication facility, virtualization products may be developed and extended much more rapidly and reliably than was previously achievable when emulation code was run solely in the OS kernel.

More particularly, a computer-based method is provided for data storage virtualization. The method includes providing a first emulation module or code running in the OS kernel of a computer or computer system (such as a virtualization server accessible by SCSI clients). A second emulation module is provided that runs in the user space of the computer (such as a Java or other higher level programming language program or code set), and the second emulation module may emulate a media changer or other device and/or provide access to additional emulation/virtualization code (e.g., to business logic that adds value to storage virtualization products). The method continues with a kernel-resident driver receiving a packet of data at a port of the computer that is linked to a data communications network (such as a SAN or the like that may be configured for communicating per Fibre Channel protocols or the like). The packet of data may include command data for a particular data storage device (e.g., a SCSI command for a SCSI device such as tape library or a disk array). Significantly, the method includes operating the first emulation module to communicate with the driver in the OS kernel and to then pass through the packet of data to the second emulation module, thereby allowing the second emulation module to run in user space but to be able to efficiently receive data from the kernel-resident driver via the first emulation module.

The method may also include the first emulation module storing a copy of the packet of data in kernel memory and the second emulation module storing a copy of the packet of data in user space memory. The method may then include a step of mapping the packets in the two memories to provide a zero copy solution when the second emulation module provides the packet of data to additional emulation processes or business logic that results in the packet of data being modified. The modified packet is returned to the first emulation module in the kernel for use in modifying the copy in kernel memory (e.g., DMA memory). In some cases, the high performance communications between the kernel emulation module and the user space module includes the kernel emulation module (first emulation module) initiating a door call function (e.g., a door call with a name of a door that the second emulation module is listening for when the OS is Solaris for example) and after modification of the packet of data by user space emulation logic/code, the second emulation module can return the modified data by initiating a door return function. Each door call, may cause the kernel to spin a processing thread in user space for the second emulation module, and the passing of the packet of data from the kernel may include a step of attaching to the corresponding thread. Further, the pass through of the packet of data may also include creating a data structure, such as a data object when the user space is object-oriented such as Java-based user space, and then receiving this data structure with the second emulation module. The data structure may be configured to control the modifications to data in its fields such as by limiting which sets/writes can be performed by emulation or other logic/modules in the user space.

Mapping of memory is typically used when the SCSI command has a "payload" associated with it that is to be returned to the client such as may be the case for a read command. In those cases, an interface (e.g., an ioctl( ) C function call or the like) is used that allows the user space emulation module to request storage from the kernel emulation module. This storage or memory is allocated by the kernel module using DMA memory and then mapped to the caller's user space so that when business logic executing within a user space process accesses this memory it is actually directly manipulating the DMA memory. Further, a technique may be employed that maps this memory space to a high level language object (e.g., a Java object or the like), again without actually making a copy. For "write" operations, the "payload" has already been received into DMA memory by the target driver. When this command is passed up to the emulation module, the same mapping technique is employed except that instead of the user space module requesting memory (e.g., as was done for a read operation), the user space memory address of the "payload" is provided in the emulation packet passed to the user space module. The emulation packet is small in size and, therefore, the copy that occurs between kernel and user space has an insignificant impact on performance. The copy of the emulation packet from kernel to user and then user to kernel can be thought of as part of an inter-process communication (IPC) mechanism. In some embodiments, the IPC mechanism may be implemented using the Solaris doors IPC facility to perform these functions automatically as part of a door_call (kernel to user) and a door_return (user to kernel).

DETAILED DESCRIPTION OF THE PREFERRED EMBODIMENTS

Briefly, embodiments of the present invention are directed to methods and systems for storage virtualization. One aspect of the methods and systems described herein is that they provide techniques and/or mechanisms for supporting communication between kernel and user space resident processes such that a relatively small/light kernel-resident emulation module (e.g., a pass through logical unit or LU provider) may communicate emulation data to a user space-resident emulation module, which in turn may communicate/interface with virtualization business logic. Typically, storage virtualization involves emulation of SCSI devices such as tape drives and disk drives, and, hence, implementations of the methods and systems may be adapted to support high performance SCSI device emulation in user space such as within storage server with a Solaris OS and using Solaris and Java facilities to support included functionalities.

Figure 1:
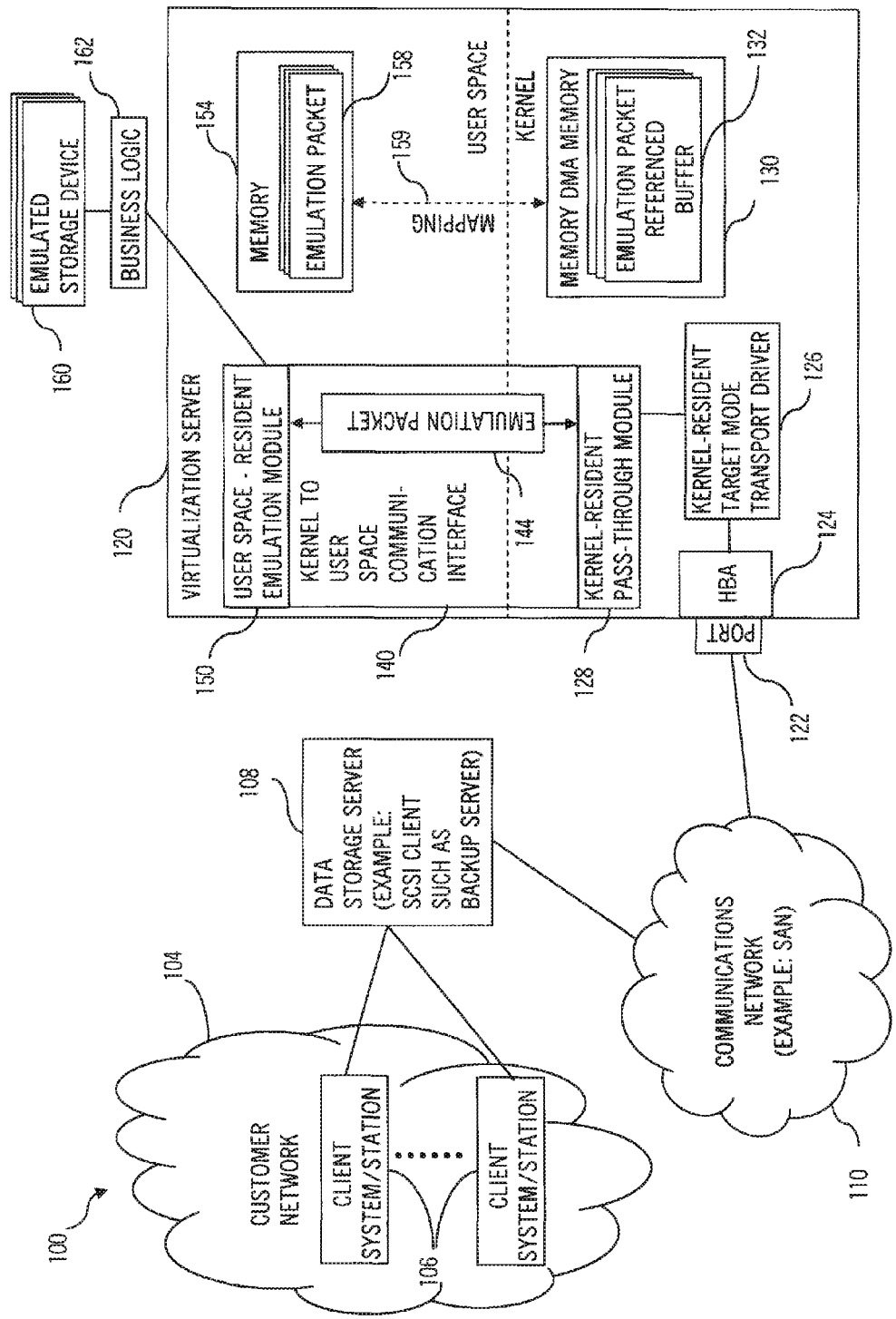
FIG. 1 illustrates a functional block diagram of a computer system or network for providing storage virtualization including kernel-to-user space process communications according to an embodiment of the invention.

FIG. 1 illustrates an exemplary computer system or storage virtualization system 100 useful for implementing aspects of the invention. The system 100 includes a customer network or system 104 with a number of client systems or workstations 106 that may generate and/or need access to data, e.g., computer devices running host and other applications. The client systems access a data storage server 108, which may be a SCSI client such as a backup server or the like. A communications network 110 is provided to link the data storage server 108 (and other clients not shown) to data storage. In this regard, the communications network 110 may be a SAN communicating data using Fibre Channel (FC) and SCSI communication protocols while other embodiments may utilize other communications networks and/or communication techniques to implement network 110.

A goal of the system 100 may be to provide emulation or virtualization of one or more storage devices with storage devices 160 providing actual data storage (e.g., emulate a SCSI tape library but the device 160 may be an array of disks or disk drive). To this end, a virtualization server 120 is provided that is linked at a port 122 with the communications network 110 to receive commands from and communicate data and messages to and from the client systems 106. For example, the port(s) or target port(s) 122 may be a FC port and a host bus adapter (HBA) 124 may be provided to act as an interface between the server 120 and the SAN/network 110. The server 120 further includes a kernel-resident target mode transport driver 126 to pass information to and from the SAN/Fibre Channel 110. As shown, the server 120 is divided up into code running in kernel and in user space (e.g., the server 120 may use the Solaris OS such that the kernel-resident code is in C or another lower/machine level programming language while the code running in the user space may be Java or some other higher level programming language.

The system 100 is adapted to move a significant amount or fraction of the emulation or virtualization code out of the kernel and into user space. As shown, a kernel-resident pass-through module 128 is provided in the kernel of server 120 to communicate or pass through data it receives from the driver 126 to a user space-resident emulation module 150 that interacts with business logic 162 to emulate storage devices 160 (e.g., present SCSI devices to SCSI clients 108). According to one aspect of the invention, a kernel-to-user space communication interface 140 is provided to enable the user space-resident emulation module 150 to communicate with the kernel-resident pass-through or emulation module 128. Generally, the interface 140 (whose operation is discussed in detail below) acts to pass a string of bytes or data in the form of an emulation packet 144 to the emulation module 150. In SCSI implementations of system 100, the emulation packet 144 includes SCSI command data or command data fields as well as other information such as command state information. The emulation module 150 then uses the data to interact with business logic 162 so as to emulate or virtualize storage devices 160 and the packet 144 is returned to the pass-through module 128 for transmittal over the SAN to the SCSI or other client 108 such as via driver 126 and HBA 124. Also, as will be explained in detail below, efficient data transfer (e.g., a zero copy solution) or efficient use of communications between the user space and kernel is achieved via special memory and/or buffer management that allows packets 158 in user space memory 154 that is operated on by the emulation module 150 and/or business logic 162 to be mapped as shown at 159 to kernel memory (or direct memory access (DMA) memory) 130 and its stored version of the emulation packets 132. Note, a distinction may be made between the emulation packet 144 used to communicate between kernel and user and the memory emulation packet 132. The memory emulation packet 132 is basically a data buffer whose address is contained in the communication emulation packet 144.

Figure 2:
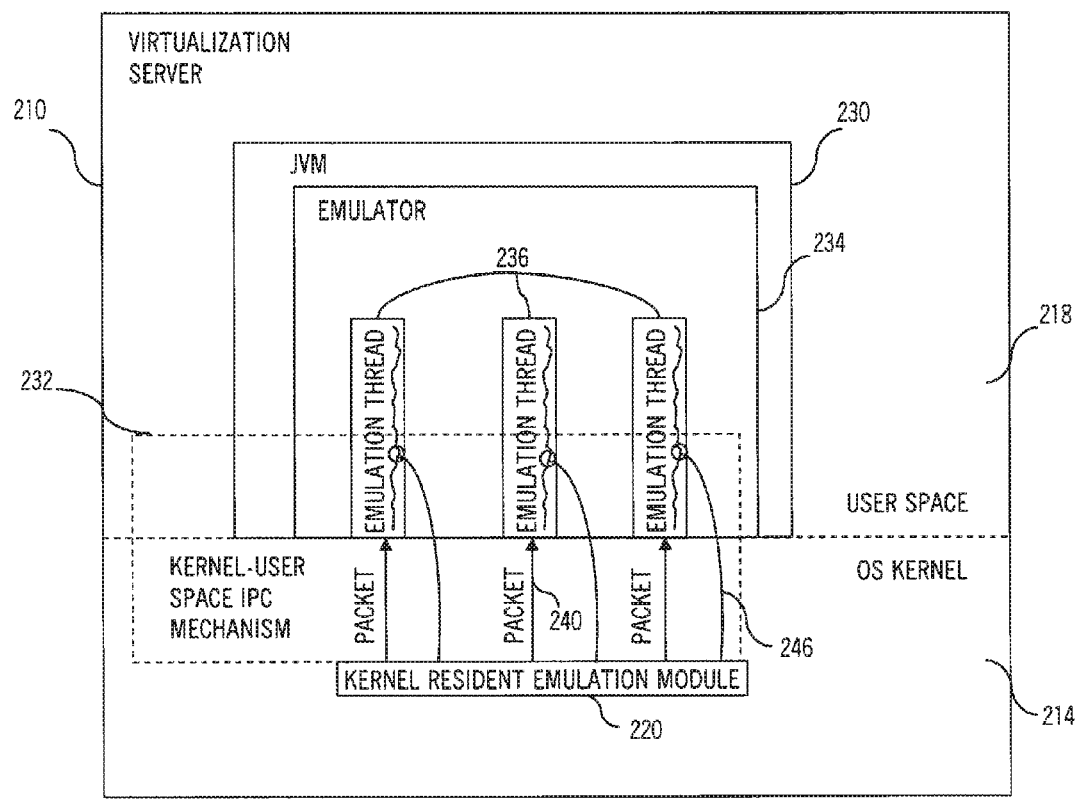
FIG. 2 illustrates a functional block diagram of a virtualization server that may be implemented in a storage virtialization system of the invention showing use of a kernel-to-user space communication mechanism to attach to emulation threads (or threads within the user space emulation process) and passing of emulation packets to these threads.

FIG. 2 illustrates a virtualization server 210 that may be used in the system 100 and other systems of the invention. As shown, the server 210 may be a Solaris computer device having a processor that runs code in an OS kernel 214 and a user space 218. In the OS kernel 214, a kernel-resident emulation module 220 is provided to interact with one or more transport drivers (not shown in FIG. 2) and to pass packets of data 246 to user space 218 using a kernel-user space interprocess communications (IPC) mechanism 232. As part of storage device emulation by server 210, a Java Virtual Machine (JVM) may be started and one or more processes of an emulator 234 may be used to facilitate receipt of transferred packets 246 (such as listener processes or processes that link the JVM 230 to processes running in OS kernel 214, which may include registering with the emulation module 220 to receive packets or byte strings related to device emulation 246). An aspect of the kernel-user space IPC mechanism 232 is that the emulation module 220 may act to or cause the JVM 230 to initiate a number of threads 236 and data is efficiently passed from the OS kernel 214 to the emulator 234 in the user space 218 in pa by attaching (as shown at 240) the kernel emulation module to threads 236.

Figure 3:
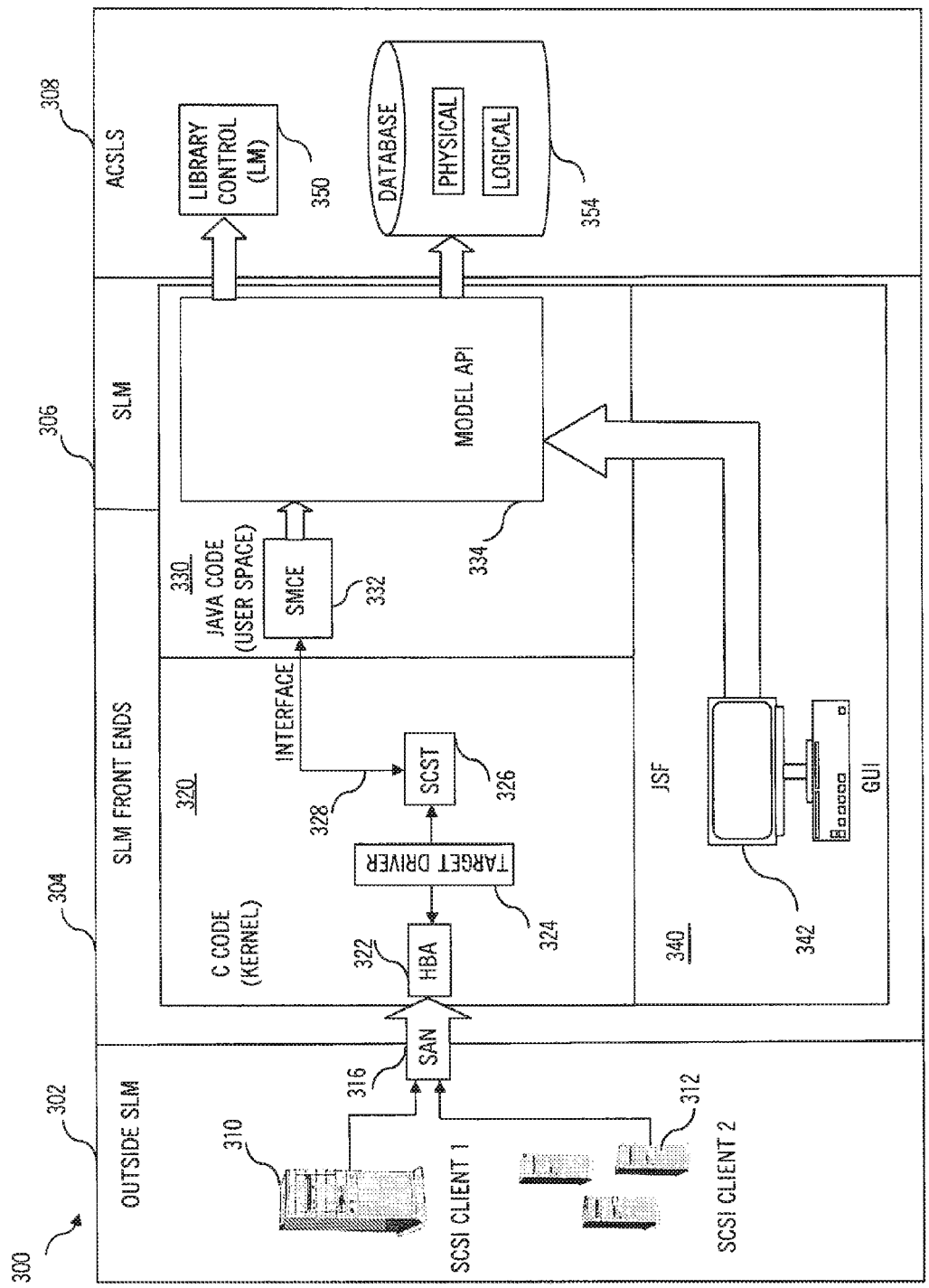
FIG. 3 is a functional block diagram of one implementation of the virtualization and kernel-to-user face communication methods of the invention to provide a tape library emulation product or system.

The techniques described herein may be used to provide high performance SCSI device emulation in user space, and it may be useful to provide a more particular example of this with a tape library emulation system 300 shown in FIG. 3. The system 300 is shown as having four sections or portions: an outside SLM portion 302, a SLM front ends portion 304, a SLM portion 306, and an ACSLS portion 308 (with "SLM" referring to storage library manager and "ACSLS" referring to Automated Cartridge System Library Software that may include software to control an Automated Cartridge System (ACS) or is library management software or business logic). A plurality of SCSI clients 310, 312 (such as backup servers and the like) access virtualization devices provided in the SLM front ends portion 304 and SLM portion 306 of system via a SAN 316. An HBA 322 is provided along with a target driver 324 running in the kernel 320, with the driver 324 generally being a C code software application for communicating over SAN 316 via HBA 322.

According to one aspect or embodiment of the invention, a small kernel resident module (labeled SCST in figure) 326 is positioned logically between the kernel resident target mode transport driver 324 running in kernel 320 and the user space SCSI device emulation code/module 332 (running in user space 330) which in this example is a SCSI media changer (and labeled "SMCE"). Note, although the user space emulation code 332 is shown in this example to be a SCSI media changer, the code 332 may be used to emulate any type of SCSI or storage device. The transport driver 324 may be a driver configured specifically for a particular HBA or set of HBAs 322 (such as an HBA provided by a particular company such as QLogic Corporation or the like with the driver then being a QLogic target driver) or be a more universal driver such as the Sun Common Multiprotocol SCSI Target Driver (COMSTAR) as available from Sun Microsystems, Inc. and described at http://opensolaris.org/os/project/comstar/.

The interface 328 between SCST module 326 (or kernel resident emulation module/code) and the SMCE 332 (or user space emulation module/code) is unique and is useful aspect of embodiments of the invention. The interface 328 in a Solaris/Java implementation utilizes a number of available facilities to provide the unique functionality and high performance SCSI protocol that may be used to perform SCSI device emulation in a user space process (module 332) using Java code rather than C code or other lower machine language. One implementation of the interface 328 as it may be used in system 300 (or server 210 or system 100) is described below in detail with reference to FIG. 4. The system 300 further includes a model application programming interface (API) 334 that may be used to interact with ACSLS 308 components such as library control/business logic 350 and ACSLS databases 354 as well as interacting with user interfaces or GUI 342 provided in the JavaServer Faces (JSF) portion 340 of the SLM front ends portion 304 and SLM portion 306 of system 300 (e.g., GUI 342 may be used to create or set business logic 350 that provides emulation of SCSI devices (not shown) used to store client data and emulate a tape library in this example with library control 350).

In some embodiments, the design of the SCST 326, interface 328, and SMCE 332 provides a clear separation of functional responsibilities. The transport layer driver is not aware of the SCSI commands contained as payload, within the transport layer packets, and the SCSI emulation code or SMCE 332 is completely unaware of the underlying protocol of the transport layer. Before turning to the flow diagram 400 of FIG. 4 that describes an embodiment of interfacing as may be performed with interface 328 and SCST 326 and SMCE 332, it may be useful to provide a more general description of communication techniques of the invention. The communication protocol between SCST 326 and SMCE 332 may be defined by exchanged emulation packets that are also labeled/termed "scstPackets" herein. The scstPacket is a data structure (such as a C data structure) that encapsulates the information useful for transferring SCSI commands and responses between the SCST module 326 and the SMCE process 332 in user space 330.

During operation of system 300, scstPackets are passed back and forth between the SCST module 326 and the SMCE process 332 in one implementation using the Solaris Doors IPC facility. The Doors IPC facility (or kernel to user space communication routine/command) provides three functions:

(1) provides a very low overhead synchronous remote procedure call (BLOC) mechanism from kernel 320 to user space 330 (e.g., provides copy of SCSI command data from kernel to user space such as set of bytes including SCSI command and other useful information but not actual data (e.g., less than about 200 bytes); (2) provides the execution context for all SMCE processing (e.g., each door call internally spawns a thread such as shown with threads 236 in FIG. 2); and (3) provides memory management to map the scstPacket from kernel 320 to user space 330 and back again (as shown with mapping 159 in FIG. 1). Coupling the use of the Doors IPC facility with a number of Java JNI methods and making use of Java's facilities for creating buffers (data objects) such as with Java DirectByteBuffer, the interface 328 provides a low overhead, zero copy solution to the problem of emulating SCSI devices with code running in user space 330 (e.g., with target port can emulate multiple LUNs that each can be any SCSI device).

Figure 4:
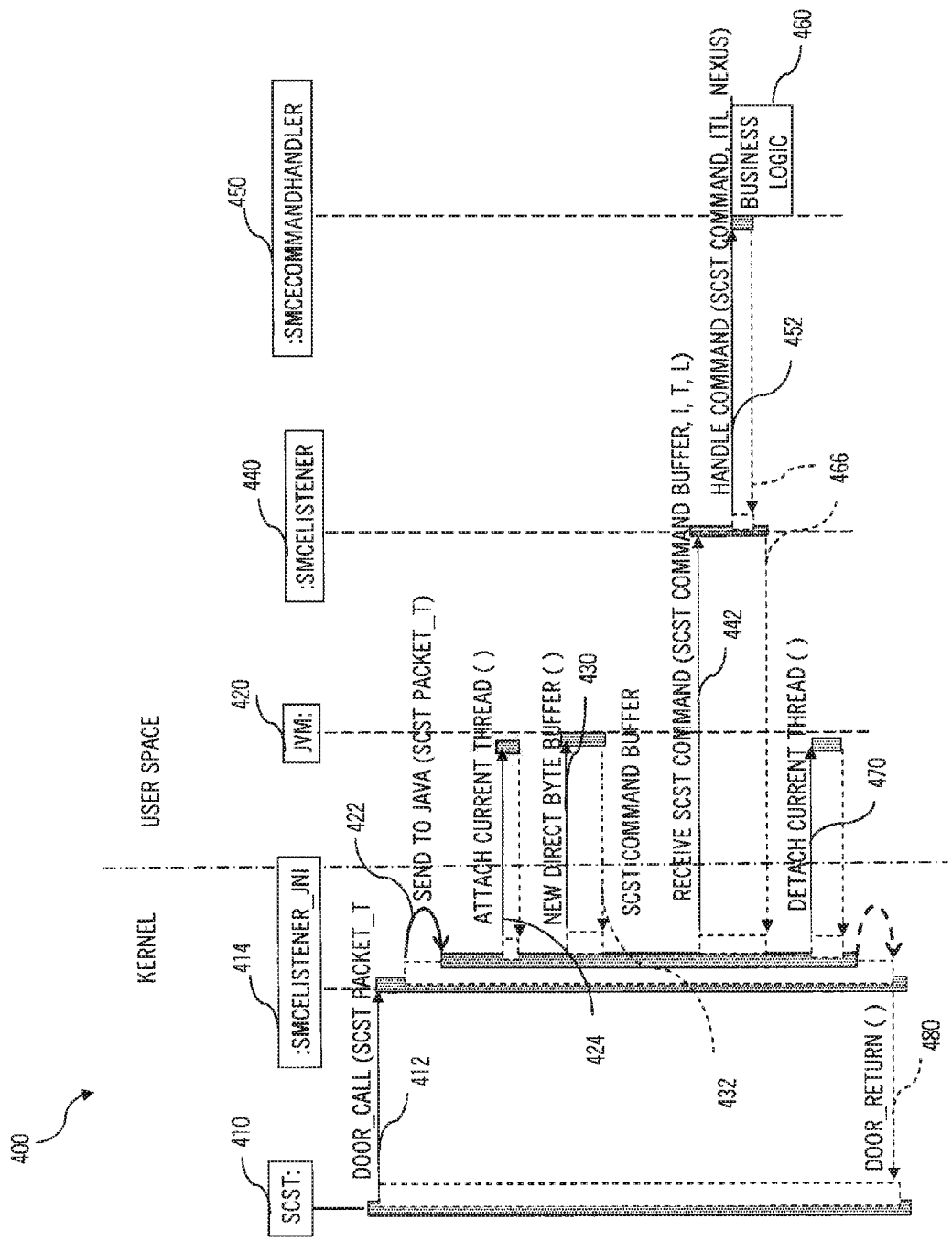
FIG. 4 illustrate process flow during communications between a kernel module and a user space-based emulation module (e.g., functionality of interface between the kernel and user space processes to provide high performance SCSI device emulation in one implementation of the invention)

FIG. 4 illustrates a sequence diagram 400 showing basic flow provided by the interfacing technique between the kernel-resident SCST 326 and the user space SMCE 332. Prior to initiating the processes of diagram 400, the interfacing or kernel process-to-user space process communication method may include starting up a Java Virtual Machine (JVM) in user space. The method may continue with initiating listening such as Java Native Interface (JNI) facilities that provide a C-to-Java interfacing mechanism. In this step, the JVM may link to C space or kernel with a JNI call and registering with the SCST 326 (or pass through LU (PTLU) provider that may be provided in embodiments using a COMSTAR or similar target driver). Listening initiation may also include opening a door and using a system call to give the name of the door, and listening may also initiated by saving a pointer to the JVM. Then, during operation of the system 300, the SCST 326 (or PTLU or other kernel-resident emulation code or SCSI command pass through modules) may receive emulation-related data or information from the SAN 316 such as a SCSI command from a SCSI client 310, 312.

At this point, the flow of diagram 400 becomes effective with the SCST 410 (or PTLU or the like) making a door call 412 passing the scstPacket to a listener for the user space emulation module 414. The emulation packet is sent at 422 to user space or to JVM 420, and the SCST 410 is attached at 424 to the current emulation thread previously spawned in the user space. Note, the AttachCurrentThread( ) function is called to provide another thread with access to the JVM and to obtain JNI interface pointer, and once attached to the JVM, a native thread works just like an ordinary Java thread running inside a native method. At 430, a data object is formed using the scstPacket such as using the NewDirectByteBuffer facility to create an scstCommandBuffer as shown at 432. The NewDirectByteBuffer function 430 allocates and returns a buffer 432 referring to a particular memory address and extending a particular number of bytes or capacity setting. Typically, native code such the SCST 410 or listener 414 but returns 432 the resulting byte-buffer (e.g., scstCommandBuffer) to Java-level code with a reference to a valid region of memory that is accessible for reading and, if appropriate, writing (e.g., returns 432 a local reference to the newly-instantiated data structure or byte buffer object.

At this point of flow 400, the data object (e.g., SCSI, command, network data, and the like) and other data such as the information initiator, the target, and the LUN are provided to the SMCE (e.g., listener 440). The user space emulation code further acts to handle or process the command at 452 with handler 450 that allows the data is the user space memory (or data object) to be used/processed by business logic 460 to affect a desired SCSI device emulation and/or storage virtualization with logic 460 with the results (e.g., sets or writes to the data fields of the data object in user space memory by logic 460) being returned at 466 to kernel or C space. At 470, the process is detached from the current thread 470 (typically, the native thread remains attached to the JVM until it calls DetachCurrentThread( ) function to detach itself), and a door return 480 is used to update the emulation packet stored in kernel or DMA memory. Note, typically the state is saved as part of the emulation packet or in packet butter because a particular command or SCSI/network information may be processed through the flow two or more times to complete a particular emulation activity.

As can be seen in diagram 400, the SCST or kernel-resident module senses one or more scstPackets to the SMCE or user space-resident module via a door call. The call wakes up a waiting thread that was previously started by the JVM that then calls into the JVM, e.g. making sue of the AttachCurrentThread and NewDirectByteBuffer functions or the like, passing the thread the scstPacket for execution. At this point, the code of the emulation mechanism of this embodiment of the invention is executing in Java on the door thread. When the SMCE is finished with command execution, status and responses are sent back to the SCST or kernel-resident module simply via the door return facility or function. The information passed between the SCST and SMCE is contained within the scstPacket. The state of each command is maintained within the packet. Optimization may be provided by including a way for the emulation code to pass back both data and status in a single door call. Also, the SMCE may make use of a buffer or memory management module (not shown) that allows a zero copy solution for transferring large data buffers.

The door function is synchronous and, hence, during operations the kernel-based code (PTLU or SCSI modules) may have multiple door calls open or going concurrently waiting for return. Also, as noted, a common SCSI target may be provided through use of a COMSTAR target that provides a port provider interface with a set of drivers for transport cards (e.g., HBA and other port providers). These drivers are kernel modules that implement the protocol for SCSI command transport, e.g. Fibre Channel, iSCSI, SAS, iSER, and the like and provide local ports to be used as targets. The port providers focus on the transport protocol and do not have knowledge of SCSI command functionality of the LUs exposed through the port. A COMSTAR target also provides a SCSI target management framework, (STMF) to communicate between the port provider interface (which knows how to communicate with Fibre Channel and the like) and an LU providers interface or layer. This latter interface layer may include the PTLU or similar kernel-resident emulation module that provides a pass through of network data such as the SCSI command data or scstPackets as discussed above to the user space-resident emulation module (e.g. via door calls or the like).

Figure 5:
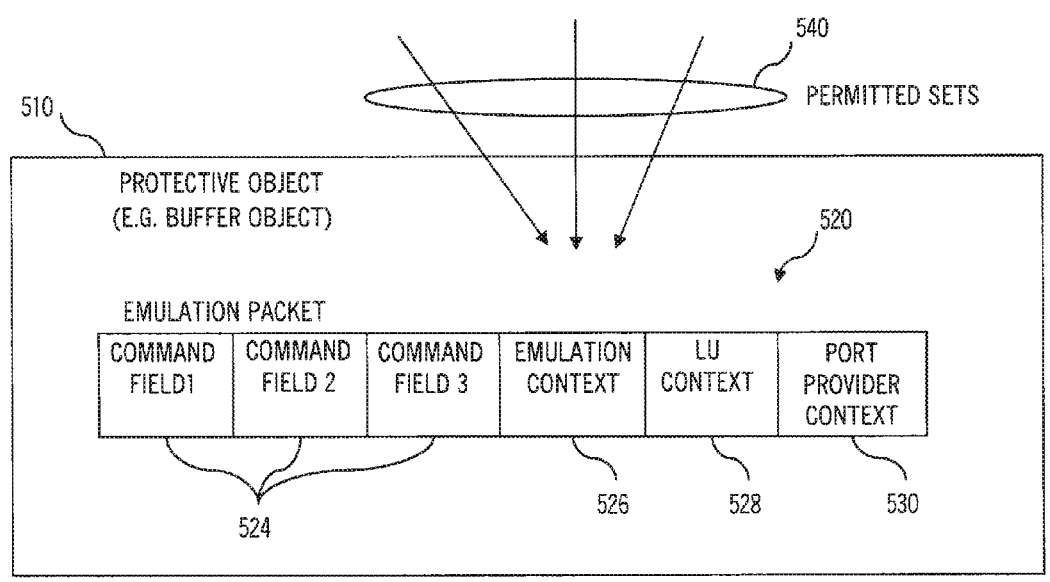
FIG. 5 illustrates an object that may be used to facilitate emulation and kernel-to-user space communications and/or transfers of emulation data during storage virtualization.

As noted with reference to FIGS. 1 and 4, the IPC mechanisms of the invention include creating a data structure or object for use in passing and processing device or network data such as SCSI commands and information useful for emulating storage devices. FIG. 5 illustrates generally a data object 510 that is wrapped around an emulation or scstPacket 520 of the invention (e.g., as may be created with a NewDirectByteBuffer function call). The emulation packet 520 generally includes a string of bytes (such as up to about 200 bytes or more) that may include a plurality of fields or data fields. As shown, a number of these fields are command fields 524 (or fields reserved for SCSI data) while other fields may include an emulator context field 526, an LU context field 528 and a port provider context field 530. These may also be thought of as providing data in input fields and output fields, and processing by business logic (as shown in process 400) may be achieved simply in some embodiments by modifying the output fields. To protect the passed command/network data, the object 510 may be adapted/defined to allow only a particular number and/or type of sets (or writes) 540 to the data in packet 520 (e.g., change the output data fields but not portions of the command fields or the like).

A copy of the packet 520, as discussed above, is stored in kernel memory or DMA memory, and at the door call a copy is made of the packet 520 in user space memory. In one SCSI embodiment, the data stored in the packet 520 includes a set of SCSI command fields 524 including a CDB or actual SCSI command field, a state or completion status field (e.g., send status, transfer data status, transfer final status, free, and other SCSI or other protocol status data), a direction field, a length field. Since the packet 520 may simply be a string of bytes, the method includes (such as initiation time) a process of explaining to the Java emulation module a technique for understanding the bytes. This definition/guide may include defining fields in the buffer by offsets and data type (e.g., integer, string, and the like), and such a definition of the data in the packet may involve performing a plurality of JNI calls to get offsets and retrieve data or a property file may be generated that can then later be read by the emulation module in user space and/or by business logic provided for device emulation to provide offsets, data types, field lengths, and the like.

In operation of a system such as that shown in FIGS. 1-3 and in process 400 of FIG. 4, the user space emulation module achieves zero copy as the user space emulation module is provided access to DMA memory (e.g., kernel memory) Regarding the DMA memory, the HBA hardware of the virtualization server knows memory (i.e., DMA memory) that it can communicate with during communications with SCSI clients/the SAN network, and a mapping function/module is provided as part of the emulation mechanism or device described herein to map the DMA memory to user space memory.

The communications between the kernel-resident emulation module (or pass-through module) and the user space-resident emulation module may be performed with zero copy I/O (i.e., I/O without copying data buffers between operations). In this respect, these two emulation modules (or a mapping/memory management mechanism/module running in the virtualization server) may function to provide single buffer allocation per I/O operation with only the address of data being copied and not the data itself. Zero copy I/O uses less memory, CPU cycles, and bus bandwidth and can provide much higher performance, and it is useful with pass-through applications such as the kernel-resident emulation module described herein.

At this point it may be useful to describe a Solaris-specific architecture or implementation for the zero copy I/O mechanism. In this embodiment, memory is allocated in kernel space. Applications call (e.g., ioctl( ) C function call) into a buffer manager kernel module (not shown in the figures but may be provided as a separate module resident in the kernel or as part of the pass-through module) to allocate and map buffers. Mapping is done via a user system call (e.g., mmap( ) C function call) from within the buffer manager kernel module. After the mapping, both kernel and user space have access to the data simultaneously (e.g., the pass-through module and the user space-resident emulation module can both access the scstPacket or other data structures/objects discussed herein). Multiple buffers may be allocated and mapped by a single application, and multiple applications may map and access the same buffer address. During operation, the buffer manager kernel module may notify the user application (e.g., the user space-resident emulation module) asynchronously that a buffer has been filled using Solaris Doors functions/facilities. The kernel fills in write data, asynchronously notifies the user application when data is available via a door upcall or the like. For reads, user applications may simply fill in the buffer and return via the door upcall. Bluffers are automatically freed when application reference count reaches zero. Briefly, the buffer manager kernel module supports calls from user space-resident emulation modules, and the applications access a kernel DMA buffer containing the scstPacket (or emulation packet/data structure) via a mapped pointer while kernel-resident modules such as kernel-resident emulation or pass-through module may access the same kernel DMA buffer directly During operation of this embodiment, zero copy data flow is achieved as buffer data may not touched by the user space-resident emulation module or copied but may be simply transferred from the kernel buffer to an I/O device.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. The above discussion provides examples of facilities available in a Solaris OS and using Java, but the invention is not limited to such embodiments but instead may be used in nearly any operating system and programming language environment to allow a lower level or kernel process to communicate with a processes running in user space or using higher level/user friendly code. Similarly, a number of Solaris and Java-specific functions/facilities were provided in the above description and these are not considered limiting but instead were provided as an example of one way to implement the inventive ideas. Those skilled in the art will understand these specific functions and facilities may be replaced with other Solaris and Java functions/facilities to achieve the same effect or by facilities/functions available in other operating system and programming environments that provide similar functionality to support internal process communications. Further, the particular emulation performed by the business logic is not limiting to the invention as nearly any storage device, SCSI device, and combination (such as a tape library, one or more tape drives, one or more disks or disk drives, and combinations thereof) may be emulated using the kernel-to user space communication processes taught by this description.

We claim:

1. A data storage virtualization method, comprising:
providing a first emulation module running in an operating system (OS) kernel of a computer;
providing a second emulation module running in a user space of the computer;
with a driver running in the OS kernel, receiving a packet of data at a port of the computer linked to a data communications network, the packet of data comprising command data for a data storage device; and
operating the first emulation module to communicate with the driver and to pass through the packet of data to the second emulation module.

2. The method of claim 1, wherein the data storage device is a Small Computer System Interface (SCSI) device and wherein the command data comprises a SCSI command.

3. The method of claim 1, wherein the first emulation module stores a copy of the packet of data in kernel memory, wherein the second emulation module stores a copy of the packet of data passed through by the first emulation module in user space memory, and wherein the method further comprises mapping the packet of data in the kernel memory to the packet of data in the user space memory.

4. The method of claim 3, further comprising with the second emulation module providing the packet of data to additional emulation processes wherein the copy of the packet of data in user space is modified, the method further comprising returning the modified copy of the packet of data to the first emulation module for use in updating the copy of the packet of data in the kernel memory.

5. The method of claim 1, wherein the operating of the first emulation module to pass through the data packet to the second emulation module comprises initiating a door call function.

6. The method of claim 5, wherein the data packet is modified to process a command in the command data by the second emulation module interfacing with additional emulation logic and wherein the modified data packet is provided to the first emulation module for communication over the data communication via the driver by initiating a door return function.

7. The method of claim 1, wherein the operating of the first emulation module to pass through the data packet further comprises attaching to a thread running in the user space for the second emulation module.

8. The method of claim 1, wherein the operating of the first emulation module to pass through the data packet further comprises creating a data structure comprising the data packet and receiving the data structure with the second emulation module.

9. A server providing storage virtualization, comprising:
   a computing environment including an OS kernel and a user space;
   a target mode transport driver resident in the OS kernel communicating with a data storage client connected to a port of the server;
   an emulation module resident in the user space operable to emulate one or more data storage devices; and
   a pass-through module resident in the OS kernel receiving a data packet corresponding to the one or more data storage devices from the target mode transport driver and passing the received data packet from the OS kernel to the user space for use by the emulation module in emulating the one or more data storage devices;
   wherein the passing of the received data packet comprises initiating an interprocess communications mechanism attaching to a thread of the emulation module and generating a data object comprising the data packet and receiving the data packet with the emulation module.

10. The server of claim 9, wherein the pass-through module stores a copy of the data packet in kernel memory and provides the emulation module with access to the data packet in the kernel memory during the emulating of the one or more data storage devices.

11. The server of claim 9, wherein the OS kernel is a Solaris operating system kernel and the interprocess communications mechanism comprises a Solaris door facility.

12. The server of claim 11, wherein the generating a data object comprises creating a data buffer object in user memory mapped to a copy of the data packet stored in kernel memory, whereby modifications to the data packet during storage emulation by the emulation module are made to the copy of the data packet in kernel memory at least upon a door return function of the Solaris door facility.

13. The server of claim 9, wherein the data storage client is a SCSI client, the one or more data storage devices comprise SCSI devices, and the data packet comprises a set of data fields including one or more of SCSI command, command state, direction, initiator, target, emulation context, logical unit (LU) context, and port provider context.

14. A SCSI device emulation method, comprising:
   running an emulation module in user space of a computer system in a first programming language, wherein the emulation module is operable to process SCSI commands and emulate at least one SCSI storage device;
   receiving a SCSI command from a SCSI client with a kernel-resident transport driver executing in a second programming language, wherein the first programming language is a higher level programming language than the second programming language;
   communicating the SCSI command within a data structure to the emulation module in the user space;
   processing the SCSI command with the emulation module; and
   operating the kernel-resident transport driver to provide a response to the SCSI client based on the processing of the SCSI command.

15. The method of claim 14, wherein the communicating of the SCSI command comprises running a kernel-resident pass-through module operable to communicate with the kernel-resident transport driver and operating to create a data structure comprising the SCSI command and to provide the data structure to the emulation module.

16. The method of claim 15, wherein the data structure comprises a plurality of data fields including a set of command fields including at least one of the following fields: a SCSI command field, a command state field, a command direction field, and a command type field.

17. The method of claim 15, wherein the kernel-resident pass-through module stores a copy of at least a portion of the data structure within kernel memory and wherein the emulation module stores a copy of the data structure within user space memory.

18. The method of claim 14, wherein the processing of the SCSI command generates modifications to data in the copy of the data structure in the user space memory and wherein the method further comprises mapping the copy of the data structure in the user space memory to the copy of the data structure in the kernel memory, whereby the modifications to the data are present in the kernel memory for use by the kernel-resident driver to provide the response.

19. The method of claim 18, wherein the computer system runs a Solaris operating system and wherein the kernel-resident pass-through module initiates a door call to communicate with the emulation module and the emulation module initiates a door return call to return the data structure including the data modifications to the kernel-resident transport driver via the kernel-resident pass-through module.

* * * * *